Sept. 20, 1932.  J. AXT ET AL  1,878,751
SPIRIT LEVEL
Filed March 5, 1931
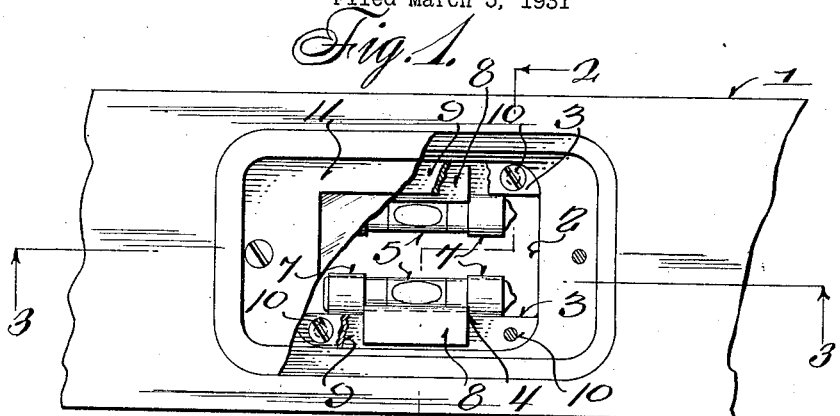
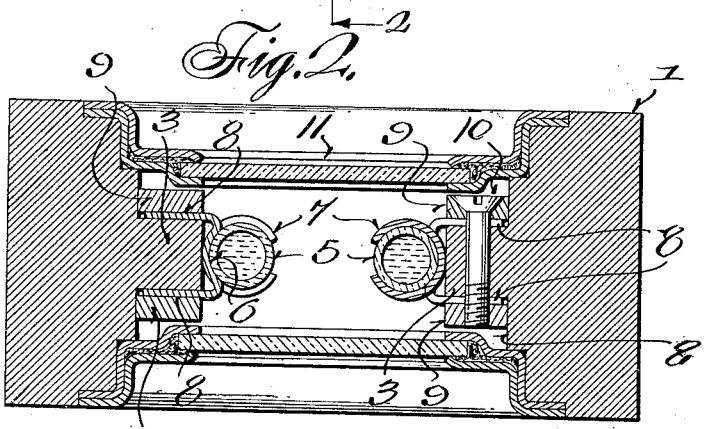
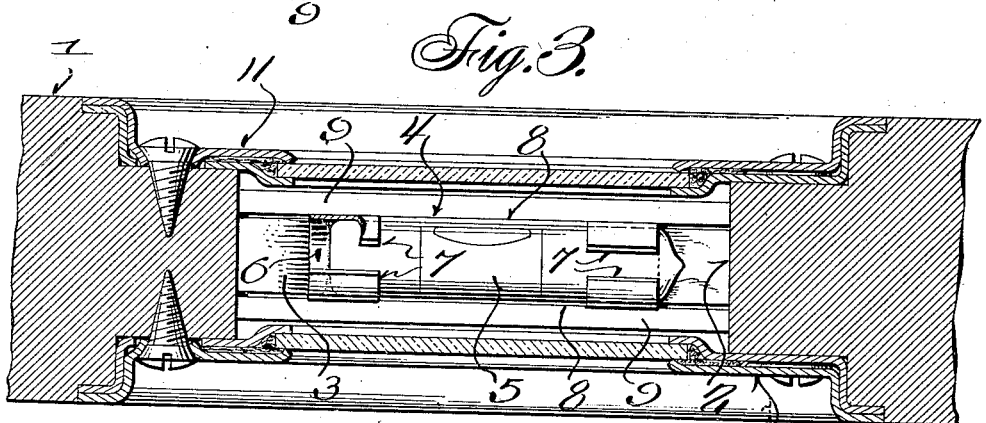
Inventors
Joseph Axt
and Paul Axt
By *[signature]*
Attorneys Patented Sept. 20, 1932

1,878,751

UNITED STATES PATENT OFFICE

JOSEPH AXT AND PAUL AXT, OF MILWAUKEE, WISCONSIN

SPIRIT LEVEL

Application filed March 5, 1931. Serial No. 520,243.

This invention pertains to spirit levels, and more particularly to the novel form of mounting for the conventional bubble or vial glass.

At the present time, it is customary to mount the vial glass within the level and thereafter permanently set the same with a plastic material, which is affected by moisture and frequently becomes loosened in use, causing the glass to get out of true or plum. Also, should warpage occur, the level becomes untrue.

The present invention has primarily for its object to provide a comparatively simple and inexpensive mounting for the vial glass, whereby the same is detachably and adjustably secured in proper position within the level, thus permitting the same to be plummed when necessary, or reset when desired, and also facilitates ready replacement of the glass.

Incidental to the foregoing, a more specific object resides in the provision of a level having a transverse opening in the body portion and provided with a web upon which a suitable clamp is adjustably mounted for reception of the spirit glass, thus providing for replacement and desired setting of the glass, and at the same time eliminating special and expensive frames, requiring accurate installation.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing, Figure 1 is a fragmentary view of a portion of a conventional type of level with the present invention applied thereto, parts being broken away to more clearly illustrate structural features;

Figure 2 is a transverse section taken on the line 2—2 of Figure 1; and

Figure 3 is a longitudinal section taken on the line 3—3 of Figure 1.

Referring now more particularly to the accompanying drawing, the numeral 1 designates the conventional body portion of the level which may be constructed from any desired material, such as wood, composition, or metal.

For the purpose of describing the present invention, an arrangement of the spirit glass is illustrated for plumming horizontal surfaces. However, as the description proceeds it will be obvious that the invention may be applied in various conventional ways for determining vertical as well as horizontal planes. Also, two spirit glasses are shown to provide for use of either edge of the level. However, it is to be understood that the invention applies to the form of mounting of the spirit glass, regardless of the number or arrangement employed.

As illustrated in the drawing, the body portion 1 is provided with a shouldered recess 2 extending transversely through the level to permit the glass to be viewed from either side, although this is not essential, as the invention is equally applicable to a pocket formed in one side or edge of the body portion.

Centrally of the recess 2, the body portion 1 is provided with a web 3, in the present instance two webs being illustrated for reception of upper and lower glasses. Mounted on the web 3 is a clip 4 for reception of a conventional spirit glass 5, the clip 4 being preferably stamped to form out of a blank of sheet material and comprising a longitudinal arcuate seat portion 6 provided adjacent its ends with struck-up annular fingers 7 adapted to receive the spirit glass 5 and retain the same upon the seat portion 6.

Intermediate the fingers 7, the sides 8 of the clamp are bent downwardly to straddle and engage the web 3. In order to securely attach the clip 4 on the web, clamping plates 9 are provided, which engage the sides 8 and force the same into binding engagement with the sides of the web 3 by means of the spaced screws 10 passing through one of the clamping plates 9 and threaded into the opposite plate, the screws 10 passing through the web 3 beyond the ends of the sides 8 of the clip, thus avoiding interference with adjustment of the clip on the web.

Obviously, from the foregoing, it will be quite apparent that an extremely simple and efficient mounting has been provided for the spirit glass, which eliminates the necessity for careful workmanship and the installation of expensive frames, and which readily permits adjustment of the glass 5 in order to properly align the same with relation to the working edge of the body portion 1. Also, in some instances where the level is to be used on an inclined plane, the present invention permits the spirit glass to be readily set at the inclination desired, and in the event of breakage the replacement is materially facilitated, it being merely necessary in replacement or adjustment to loosen the screws 10 and release the sides 8 of the clamp, allowing the clip to be removed or adjusted.

While the sides 8 will ordinarily serve to properly hold the spirit glass 5 for the purpose of eliminating any possibility of shifting, it is proposed after positioning the glass within the clip to insert a drop of paint or other adhesive material in the end of the clamp, which after drying serves to seal the glass in position within the clip as best shown in Figure 3.

Also, for the purpose of facilitating clear vision of the bubble within the spirit glass, it is proposed to coat the arcuate seat portion 6 of the clip 4 with a coating of light paint or other suitable material.

In order to protect the spirit glass the shouldered recess 2 is provided upon opposite sides with suitable closure plates 11, which in the present instance form no particular part of the invention, inasmuch as the glass mounting is in no way dependent upon the same. Therefore, the recess is left entirely open, or any type of suitable transparent closure is provided.

While the specific structure of mounting has been illustrated and described in some detail, it is also to be understood that various changes in the precise embodiment are contemplated, the salient feature of the invention residing in the detachably and adjustable mounting of the glass on a portion of the level body itself.

We claim:

1. A spirit level comprising a body member provided with a transverse opening and a web disposed in said opening, a clip provided with sides for straddling said web and engaging the sides thereof, means for binding said sides into engagement with the sides of said web, and a spirit glass carried by said clip.

2. A spirit level comprising a body member provided with a transverse opening and a web disposed in said opening, a clip comprising a seat, parallel sides projecting from said seat for engagement with said web, fingers projecting from said seat, a spirit glass positioned on said seat and engaged by said fingers, and means for binding the sides of said clip to the sides of said web.

3. A spirit level comprising a body member provided with a transverse opening and a web disposed in said opening, a clip comprising a seat, parallel sides projecting from said seat for engagement with said web, fingers projecting from said seat, a spirit glass positioned on said seat and engaged by said fingers, plates engaging the outer faces of the sides and adjustable means engaging the plates for binding the sides of said clip on the sides of said web.

4. A spirit level comprising a body member provided with a transverse opening and a web disposed in said opening, a clip comprising a seat, parallel sides projecting from said seat for engagement with said web, fingers projecting from said seat, a spirit glass positioned on said seat and engaged by said fingers, plates for binding the sides of said clip on the sides of said web, and means for drawing the plates towards one another.

In testimony that we claim the foregoing we have hereunto set our hands at Milwaukee, in the county of Milwaukee and State of Wisconsin.

JOSEPH AXT.
PAUL AXT.